United States Patent
Lindbom

(10) Patent No.: US 9,795,091 B2
(45) Date of Patent: Oct. 24, 2017

(54) TREE FELLING AND GRAPPLING HEAD

(71) Applicant: A W Trinder Limited, Richmond (NZ)

(72) Inventor: Mark Patrick Lindbom, Nelson (NZ)

(73) Assignee: A W Trinder Limited (NZ)

( * ) Notice: Subject to any disclaimer, the term of this patent is extended or adjusted under 35 U.S.C. 154(b) by 1150 days.

(21) Appl. No.: 13/845,359

(22) Filed: Mar. 18, 2013

(65) Prior Publication Data

US 2014/0261890 A1    Sep. 18, 2014

(51) Int. Cl.
*A01G 23/08* (2006.01)
*A01G 23/091* (2006.01)

(52) U.S. Cl.
CPC ........... *A01G 23/08* (2013.01); *A01G 23/091* (2013.01)

(58) Field of Classification Search
CPC .... A01G 23/08; A01G 23/081; A01G 23/083; A01G 23/085; A01G 23/091; A01G 23/093; A01G 23/095; A01G 23/097; A01G 23/09
See application file for complete search history.

(56) References Cited

U.S. PATENT DOCUMENTS

| | | | |
|---|---|---|---|
| 5,390,715 A | 2/1995 | Luscombe | |
| 6,374,877 B1 | 4/2002 | Wildey | |
| 6,408,906 B1 | 6/2002 | Moon et al. | |
| 6,962,178 B2 * | 11/2005 | Duval | A01G 23/097 144/208.1 |
| 7,311,126 B2 | 12/2007 | Sharp | |
| 7,882,864 B2 * | 2/2011 | Fargeot | A01G 3/08 144/34.1 |
| 2007/0215247 A1 | 9/2007 | Johnson | |
| 2008/0017273 A1 * | 1/2008 | Ronkko | A01G 23/081 144/4.1 |
| 2008/0196790 A1 | 8/2008 | Fargeot | |

FOREIGN PATENT DOCUMENTS

| | | |
|---|---|---|
| AU | 2009100494 A4 | 8/2009 |
| AU | 2011200196 B2 | 6/2012 |
| CA | 2 650 748 A1 | 7/2010 |
| WO | 02/071833 A1 | 9/2002 |

OTHER PUBLICATIONS

"ClimbMAX Steep Slope Harvester," You Tube, http://youtube.com/watch?v=4FwgrE6afvs, published on Aug. 22, 2012, two pages.

* cited by examiner

*Primary Examiner* — Matthew G Katcoff
(74) *Attorney, Agent, or Firm* — Lewis Rice LLC

(57) ABSTRACT

A grappling and severing head for gripping and severing a tree stem, having a grapple assembly and a severing assembly. Grapple arms are attached to a grapple body and extend forward beyond a front face of the grapple body. A severing assembly body is attached to the grapple body and is moveable between a retracted position and an extended position. A severing device is attached to the severing assembly body and is moveable between a stowed position and a range of deployed positions. When the severing device is in the stowed position and the severing assembly body is in the retracted position, the severing device and the severing assembly body lie substantially behind the front face of the grapple. body and/or behind the gripping face of at least one of the grapple arms.

13 Claims, 13 Drawing Sheets

TREE FELLING AND GRAPPLING HEAD

BACKGROUND

1. Field of the Invention

The present invention relates to a tree felling and grappling head and in particular to a tree felling and grappling head for attachment to a boom of vehicle used in forestry or logging operations. The head has grapple arms which can grip around the trunk of a tree, and a saw that can cut through the tree trunk being gripped by the grapple arms.

2. Description of Related Art

A tree felling head is attached to the boom of a vehicle and used in the forestry industry. Felling heads have been used for severing the tree stem from its stump and laying the severed stem on the ground for later extraction from the forest by other means. The cutting tools used in felling heads may include circular saws, discs, guillotines and chainsaws. In the United States of America and Canada, circular saws and discs are more commonly used because tree size is relatively small. Chainsaw cutting mechanisms are typically used for tree felling operations in New Zealand where average tree sizes are significantly larger.

Felling heads are also used for grappling or shovelling operations in which felled stems are picked up off the ground and repositioned to facilitate more efficient or cost effective extraction to a site where the stems will ultimately be loaded onto transport, for example trucks or railway cars.

U.S. Pat. No. 5,390,715 describes an apparatus for cutting and pruning trees. A grapple and saw assembly 23 includes a grapple assembly 29 and a saw assembly 50. The saw assembly is attached to the output shaft 48a of a rotary hydraulic motor 48. The motor and the grapple assembly are attached to a frame 24. The saw assembly includes a chain saw hydraulic motor 51. A positioning mechanism permits the saw assembly to rotate through an arc of 360 degrees independently of movement of the grapple assembly.

U.S. Pat. No. 6,374,877 describes a bar saw feller buncher and method of felling trees. Harvesting arms 18, 20, 22 are pivotally attached to a frame 12 of a bar saw felling head 10. A bar saw 14, includes a saw bar and cutting chain is driven by a motor 16. A rotary or linear hydraulic actuator may rotate the bar saw through 90 degrees about the axis of the chain saw drive motor 16, or a different axis, to move the saw between a home position, in which the saw is housed in an open-sided box 40, and a cocked position.

U.S. Pat. No. 7,311,126 and corresponding New Zealand patent 532008 describe a grapple head assembly with a grapple 1 and a cut-off chain saw 30. A hydraulic saw drive motor 20 is mounted in a head portion 20 of the grapple. The saw bar 42 pivots about the saw drive sprocket 25, which is preferably coaxial with a pivot axis of a jaw 4 of the grapple.

The effectiveness of grappling or shovelling by prior art felling heads is limited due to the position of the saw box that houses the cutting mechanism.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

SUMMARY OF INVENTION

An object of at least one embodiment of the invention is to provide a tree felling and grappling head with a repositionable severing mechanism, or at least to provide the public with a useful choice.

In a first aspect, the invention may be broadly said to be a tree felling and grappling head for gripping and severing a tree stem, the tree felling and grappling head comprising: a grapple assembly comprising a grapple body and opposing grapple arms that define a grapple zone, the grapple arms being at respective opposite sides of the grapple zone; a coupling head by which the tree felling and grappling head can be suspended from a supporting device; a saddle that is rotatably attached to the coupling head for rotation of the saddle, relative to the coupling head, about a saddle rotation axis; and a severing assembly comprising a severing assembly body and a severing device; wherein: the grapple body is tiltable relative to the saddle through at least 90 degrees about a grapple body tilt axis that is substantially perpendicular to the saddle rotation axis, between a tree felling configuration and a grappling configuration; the grapple arms are attached to the grapple body and extend forward beyond a front face of the grapple body when the grapple body is in the tree felling configuration; each of the grapple arms has a gripping face for contacting an object when gripped by the grapple arms; the severing assembly body is pivotally attached to the grapple body at a severing assembly body pivot axis for pivoting relative to the grapple body, between a retracted position and an extended position; the severing device is pivotally attached to the severing assembly body for pivoting about a severing device pivot axis, relative to the severing assembly body, between a stowed position and a range of deployed positions; wherein the severing assembly body pivot axis and the severing device pivot axis are respectively at the opposite sides of the grapple zone; and when the severing device is in the stowed position and the severing assembly body is in the retracted position, the severing device and the severing assembly body lie substantially behind the front face of the grapple body and/or behind the gripping face of at least one of the grapple arms.

Preferably, the grapple arms are pivotally attached to the grapple body at grapple arm pivot axes for pivoting, relative to the grapple body, between an open arm configuration and a closed arm configuration.

Preferably, the severing assembly body pivot axis and at least one grapple arm pivot axis are a common axis. In an alternative embodiment, the severing assembly body pivot axis is different from any of the grapple arm pivot axes.

Alternatively, at least two of the grapple arms are pivotally attached to the grapple body for pivotal rotation about a first grapple arm pivot axis and at least one of the grapple arms is pivotally attached to the grapple body for pivotal rotation about a second grapple arm pivot axis, for moving the grapple arms between an open arm configuration and a closed arm configuration, and the severing assembly body is pivotally attached to the grapple body for pivotal rotation about the first grapple arm pivot axis.

Preferably, the saddle is rotatable, relative to the coupling head, through at least 360 degrees.

Preferably, the grapple arm pivot axes are substantially coplanar and the grapple body is tiltable, relative to the saddle, through at least 90 degrees, and preferably at least about 150 degrees, for moving the grapple arm pivot axes between a substantially horizontal orientation and a substantially vertical orientation, when the saddle rotation axis is substantially vertical.

The housing may house an actuator for moving the severing device between the stowed position and the range of deployed positions, and may house an actuator for moving the severing assembly body between the retracted position and the extended position.

Preferably, the severing device is a chain saw, and the chain saw comprises a bar which carries a cutting chain and is pivotally attached to the housing for movement of the chain saw between the stowed position and the range of deployed positions.

In a second aspect, the invention may be broadly said to be a method of using the tree felling and grappling head of the above-mentioned first aspect of the invention, or any of its preferences or alternatives, the method comprising:

a. with the severing device in the stowed position, positioning the tree felling and grappling head, and closing the grapple arms to grip a portion of the stem of a standing tree with the grapple arms;

b. with the severing assembly body in the extended position, progressively extending the severing device through the range of severing positions to sever the stem below the gripped portion;

c. retracting the severing device to the stowed position;

d. allowing the weight of the severed stem to reorient the tree felling and grappling head; and e. opening the grapple arms to release the severed stem.

Preferably, the method comprises:

f. retracting the severing assembly body to the retracted position; and g. positioning the tree felling and grappling head, and closing the grapple arms to grab the stem of a felled tree with the grapple.

Preferably, the method comprises:

h. progressively extending the severing device through the range of severing positions to sever the grabbed stem; and i. retracting the severing device to return the severing device to the stowed position.

Preferably, the method comprises:

j. relocating the grabbed stem: and k. opening the grapple arms to release the grabbed stem.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The term 'comprising' as used in this specification or in the accompanying claims means 'consisting at least in part of', that is to say when interpreting statements in this specification or in the accompanying claims which include that term, the features, prefaced by that term in each statement, all need to be present but other features can also be present.

The term "behind", as used in this specification or in the accompanying claims to define a positional relationship of one feature with respect to another feature, is to be understood as meaning that one of the features is further back than the other feature, but is not necessarily directly in line behind the other feature.

As used herein, the term "and/or" means "and" or "or", or both.

As used herein, "(s)" following a noun means the plural and/or singular forms of the noun.

BRIEF DESCRIPTION OF THE DRAWINGS

Preferred embodiments and methods of utilising the invention will be further described by way of example only and without intending to be limiting, with reference to the accompanying figures in which.

DETAILED DESCRIPTION OF EMBODIMENTS OF THE INVENTION

Figure 1:
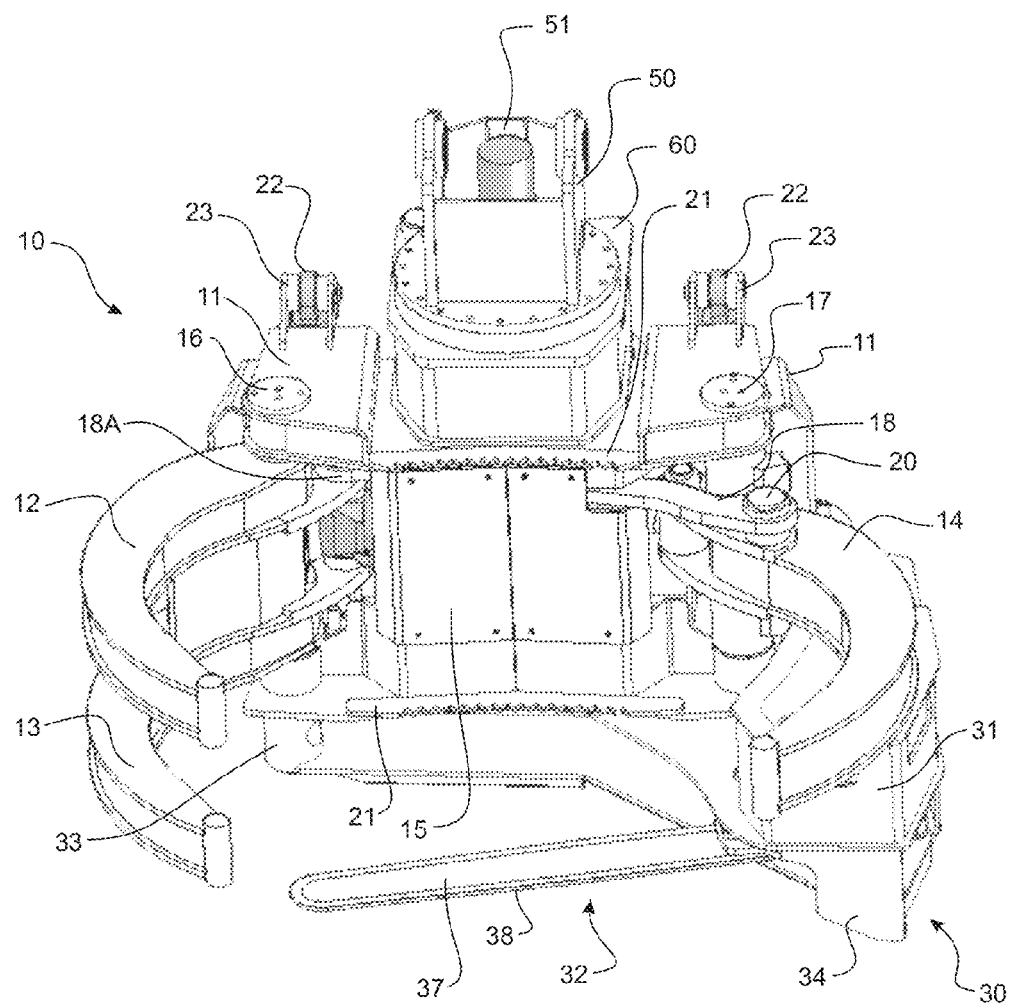
FIG. 1 shows a front perspective view of a grappling and severing head according to the invention, with a grapple body tilted to an upward position, grapple arms extended forwardly in a partially open configuration, a severing assembly body in an extended position, and a chain saw in a deployed position.

Referring to the figures it will be appreciated that the invention may be implemented in various forms and modes. The following description of embodiments of the invention is given by way of example only.

The figures show a grappling and severing head for use in forestry harvesting operations and particularly for gripping and severing a tree stem or trunk. The grappling and severing head comprises a grapple assembly 10 and a severing assembly 30.

The grapple assembly 10 comprises a grapple body 11 and three grapple arms 12, 13 and 14. Each grapple arm extends forward beyond a bed plate 15 at a front face of the grapple body.

The severing assembly 30 comprises a severing assembly body 31 and a severing device, such as chain saw 32, which is attached to the severing assembly body.

The grapple arms 12, 13 and 14 are progressively reconfigurable between an open arm configuration shown in FIGS. 1, 2, 6 to 8 and 10 to 12, and a closed arm configuration shown in FIGS. 3, 7, 9 and 13. Partially-open arm configurations are shown in FIGS. 4 and 5.

Figure 3:
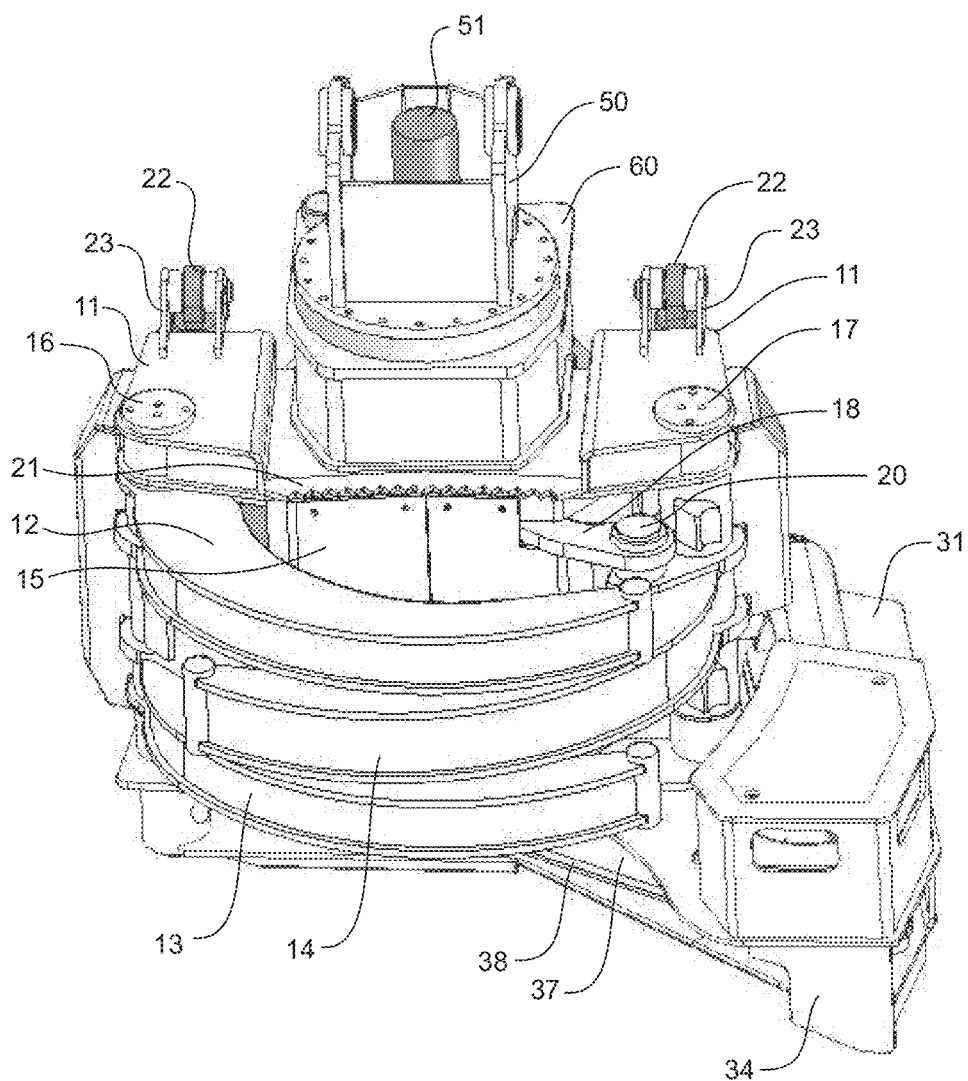
FIG. 3 shows a front perspective view of the grappling and severing head of FIGS. 1 and 2, with the grapple body tilted to the upward position, the grapple arms extended forwardly in a closed configuration, the severing assembly body in the extended position, and the chain saw in a stowed position.
Figure 4:
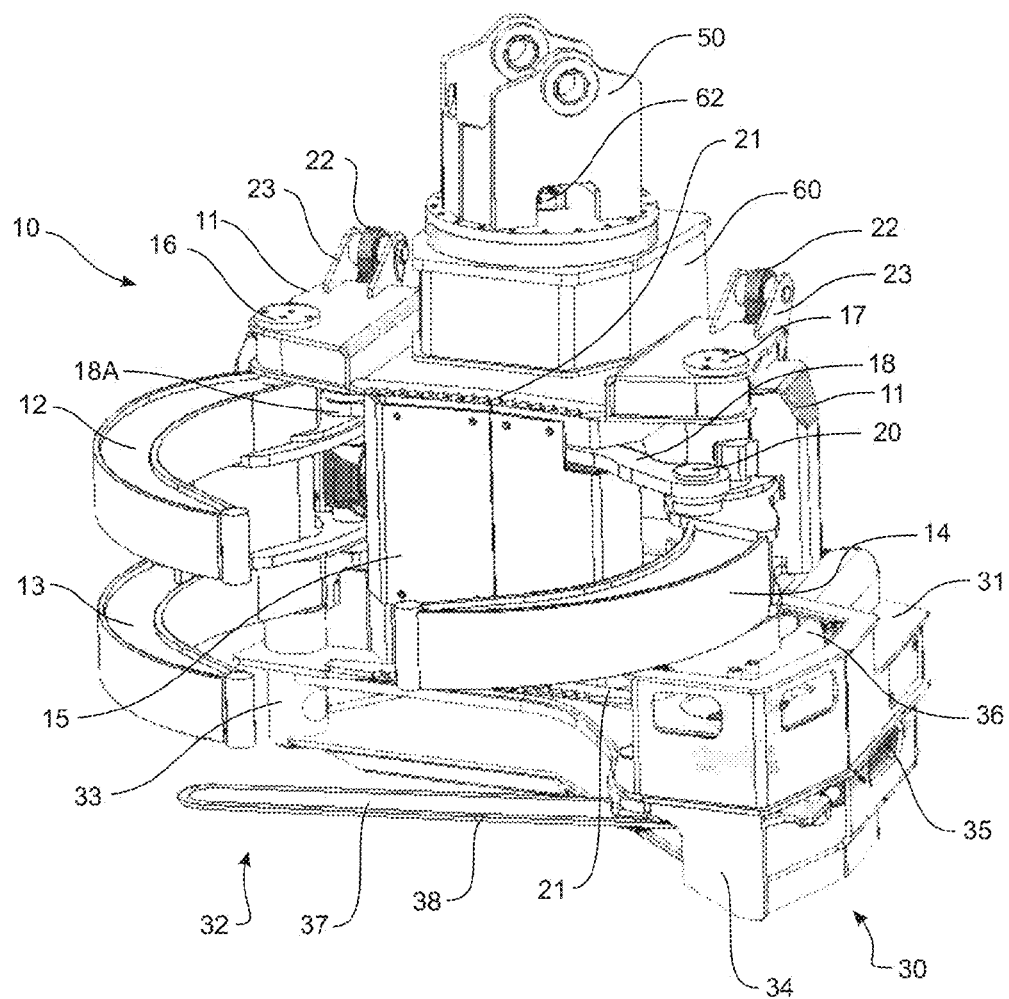
FIG. 4 shows a perspective view of the grappling and severing head of FIGS. 1 to 3, with the grapple body tilted to the upward position, the grapple arms extended forwardly in a partially open configuration, the severing assembly body in the extended position, and the chain saw in a deployed position.
Figure 5:
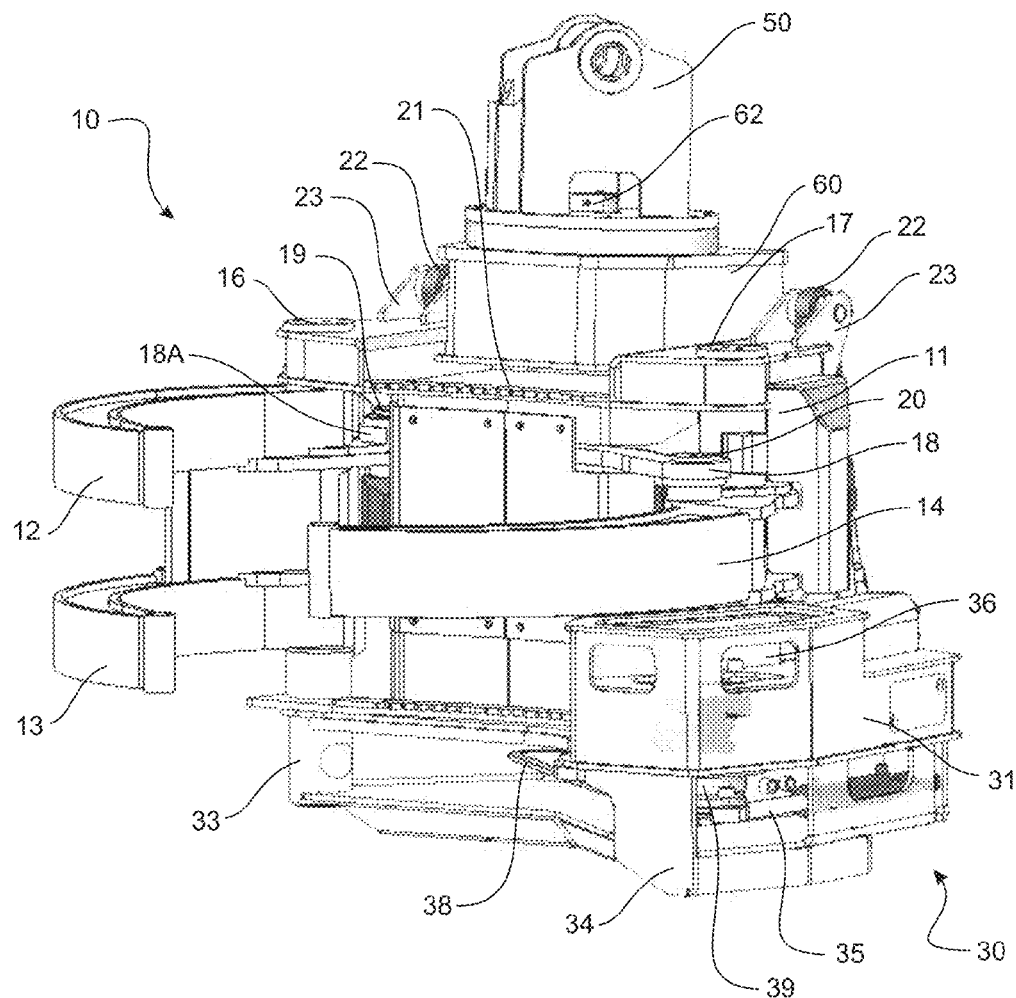
FIG. 5 shows a perspective view of the grappling and severing head of FIGS. 1 to 4, with the grapple body tilted to the upward position, the grapple arms extended forwardly in a partially open configuration, the severing assembly body in the extended position, and the chain saw in the stowed position.
Figure 6:
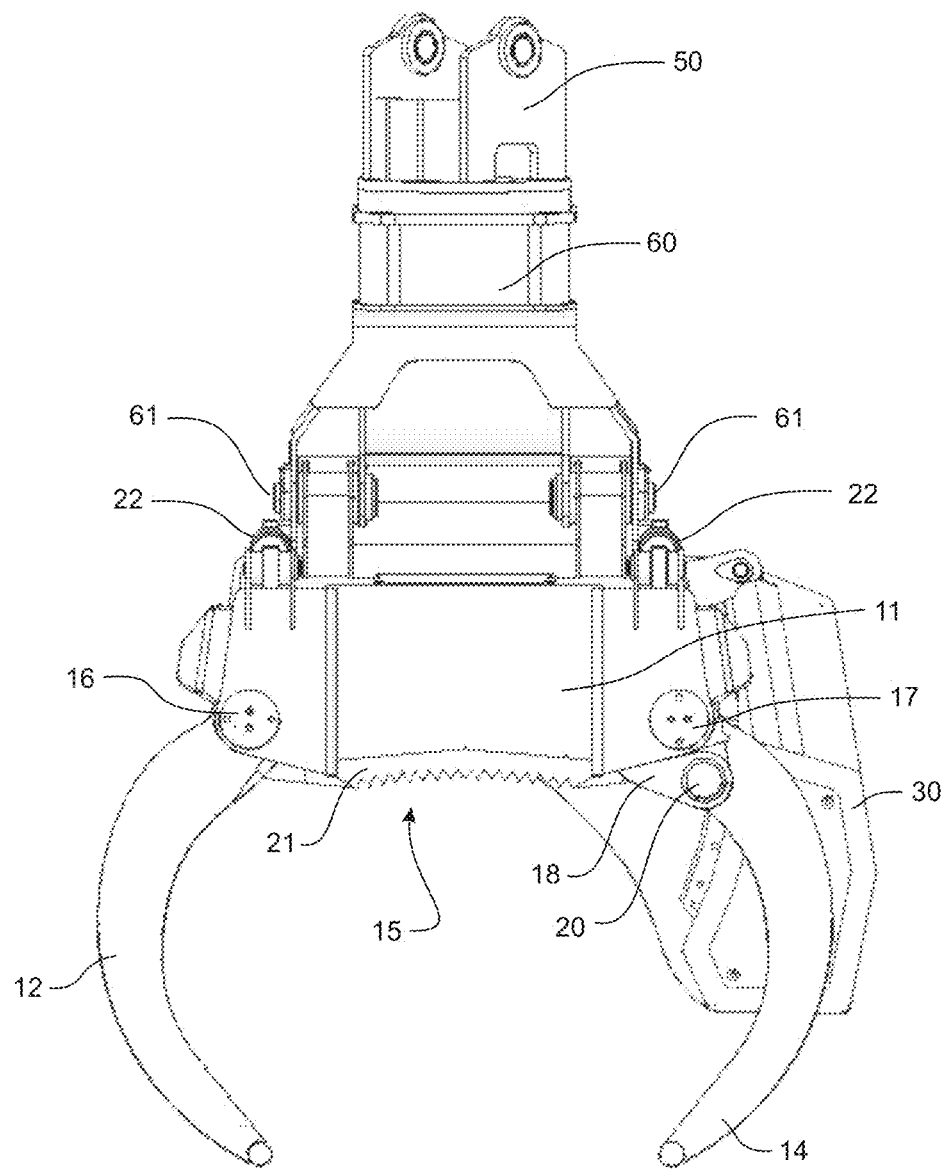
FIG. 6 shows a front view of the grappling and severing head of FIGS. 1 to 5, with the grapple body tilted to a downward position, the grapple arms extended downwardly in the open configuration, the severing assembly body in the extended position, and the chain saw in the stowed position.
Figure 7:
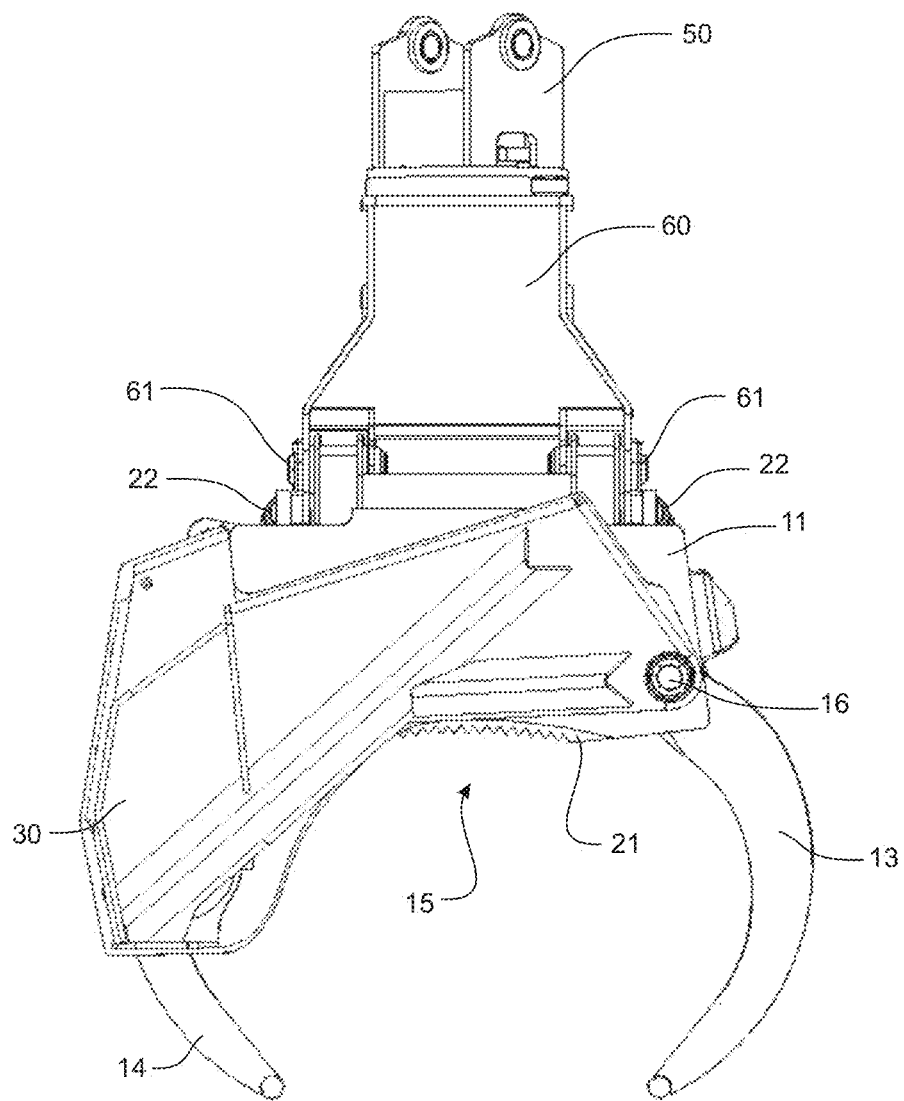
FIG. 7 shows a rear view of the grappling and severing head of FIGS. 1 to 6, with the grapple body tilted to the downward position, the grapple arms extended downwardly in the open configuration, the severing assembly body in the extended position, and the chain saw in the stowed position.

The severing assembly body 31 is pivotally attached to the grapple body 11 at pivot 33, shown in FIGS. 1, 4 and 5. The severing assembly body is pivotable, relative to the grapple body, about a severing assembly body pivot axis at pivot 33 for moving the severing assembly body 31 between an extended position, shown in FIGS. 1 to 9, and a retracted position, shown in FIGS. 10 to 13.

The severing assembly body 31 is positioned in its retracted position when the grapple and severing head is to be used in a shovelling or grappling mode in which the grapple and severing head grips, and optionally severs, the stem of an already-felled tree. In this retracted grappling position, the severing assembly body 31 lies substantially behind the bed plate 15 at the front face of the grapple body 11.

The severing assembly body 31 is positioned in the extended position when the grapple and severing head is to be used in a felling mode in which the grapple and severing head grips and then severs the stem of a standing tree to fell the tree. In this extended felling position, at least a substantial portion of the severing assembly body 31 extends in front of the bed plate 15 at the front face of the grapple body 11.

Figure 2:
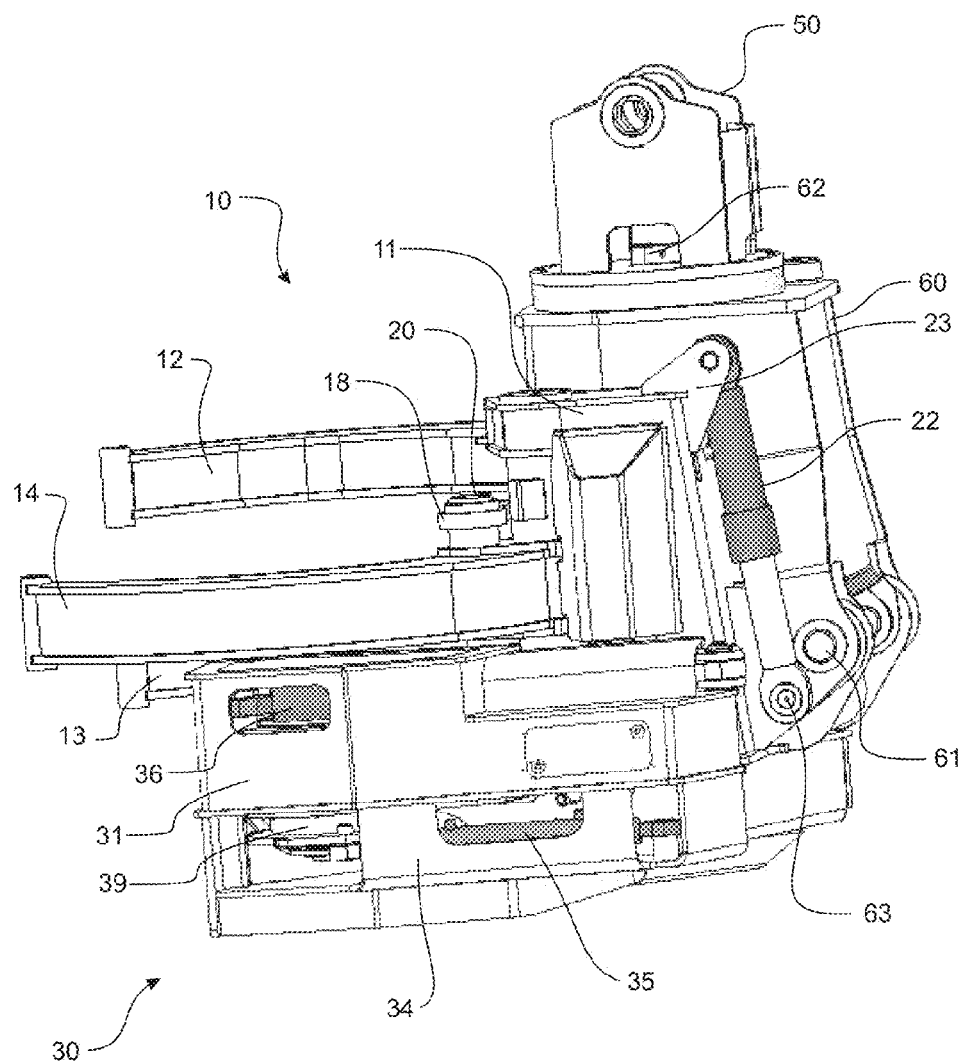
FIG. 2 shows a side perspective view of the grappling and severing head of FIG. 1, with the grapple body tilted to the upward position, the grapple arms extended forwardly in a partially open configuration, the severing assembly body in the extended position, and the chain saw in the deployed position.

The severing assembly body 31 comprises a housing 34. The severing device, which is preferably a chain saw 32 as shown in the figures, is moveably attached to the housing for movement between a stowed position, shown in FIGS. 3 and 5 to 13, and a range of deployed positions, some of which are shown in FIGS. 1, 2 and 4. In the stowed position, the chain saw 32 is stowed substantially inside the housing 34. In the deployed positions, a severing portion of the chain saw extends outside the housing for cutting and severing a stem held in the grapple.

The housing 34 houses a first hydraulic actuator or ram 35, partially shown in FIGS. 2, 4 and 5, which is extended and retracted to move the chain saw 32 between the stowed position and the range of deployed positions. The housing also houses a second hydraulic actuator or ram 36, shown at least partially in FIGS. 2 and 4, 5, 8, 9, 12 and 13, which is extended and retracted to pivot the severing assembly body 31 and move it between its extended position, shown in FIGS. 1 to 9, and its retracted position, shown in FIGS. 10 to 13.

The chain saw 32 has a bar 37 that carries an endless cutting chain 38 driven by hydraulic motor 39, via a chain drive sprocket 40 located at the proximal end of the bar, as best seen in FIGS. 6 to 9. The chain saw bar is pivotally attached to the housing 34 for pivoting about the axis of the chain drive sprocket 40, to pivot the chain saw between the stowed position and the range of deployed positions.

The chain saw bar 37 pivot axis, at the axis of the chain drive sprocket 40, is spaced apart from, and substantially parallel to, the severing assembly pivot axis at pivot 33. In the embodiment shown in the figures, these two pivot axes are on opposite sides of the grapple zone between the opposing grapple arms. Extension and retraction of the severing assembly body 31 moves the pivot axis of the chain saw bar respectively forward and rearward of the bed plate 15 at the front of the grapple body 11.

The chain saw motor 39 is housed, as are the actuators 35 and 36, inside the housing 34 to protect these components from impacts, for example with other machinery or with trees, logs or the ground. Apertures are provided in the walls of the housing for inspection and servicing of components in the housing. The apertures are covered, in use, by cover plates which have been omitted from the figures to show the internal components.

Two of the grapple arms 12 and 13 are pivotally attached to the grapple body 11 for pivotal rotation of these two grapple arms, relative to the grapple body, about a first grapple arm pivot axis at pivot 16. A third grapple arm 14 opposes the two grapple arms and is pivotally attached to the grapple body 11 for pivotal rotation of the third grapple arm, relative to the grapple body, about a second grapple arm pivot axis at pivot 17. The three grapple arms pivot about the respective pivots to move the grapple arms between the open arm configuration and the closed arm configuration.

The grapple arm pivot axes are substantially coplanar and substantially parallel, and the severing assembly body pivot axis at pivot 33 and the pivot axis of the two grapple arms 12 and 13 at pivot 16 share a common axis provided by a single pivot pin.

The two grapple arms 12 and 13 are a unitary construction and move together about their common pivot 16. One end of a link 18 is pivotally attached to the opposing third grapple arm 14 at a pivot pin 20 located in front of the pivot 17 about which the opposing third grapple arm 14 rotates. The other end 18A of the link 18 is pivotally attached to a rearward extension of the two grapple arms 12 and 13, at a pivot 19 (seen in FIG. 5). A hydraulic ram (not shown) is housed in the grapple body 11 and is pivotally attached to a rearward extension of the opposing third grapple arm 14 to rotate that arm about its pivot 17. Rotation of the opposing third grapple arm 14 is coupled via linkage 18 to simultaneously rotate the two grapple arms 12 and 13 in an opposite direction about their common pivot 16, to move the three grapple arms between the open and closed arm configurations.

The grappling and severing head also comprises a coupling head 50 by which the grappling and severing head can be suspended from a supporting device (not shown), such as the boom of a vehicle. The grappling and severing head may further comprise a saddle 60 that is rotatably attached to the coupling head 50 for unlimited rotation of the saddle through 360 degrees or more, relative to the coupling head, about a saddle rotation axis at a pivot pin 62 (an upper end of which may be seen in FIGS. 2, 4 and 5). A hydraulic motor 51, shown in FIGS. 1 and 3, is located in the coupling head 50, for rotating the saddle relative to the coupling head.

The grapple body 11 is pivotally attached to the saddle 60 for tilting of the grapple body through at least 90 degrees, and preferably at least 165 degrees, relative to the saddle, about a grapple body tilt axis at saddle pivot 61. The grapple body tilt axis at saddle pivot 61 is substantially perpendicular to the saddle rotation axis at pivot pin 62.

Two hydraulic rams 22 are connected between respective ram mounts 23 on the grapple body 11 and respective pivot pins 63 on the saddle 60, and are simultaneously extended or retracted to tilt the grapple body relative to the saddle. The rams 22 are extended to lift the grapple body to an initial felling position, with the grapple arms extending substantially horizontally, as shown in the figures, for gripping the stem of a standing tree about to be felled. After the stem has been severed, the rams 22 can be retracted to tilt and lower the grapple body to a grapple position to tilt and lower the severed stem to the ground. In the grapple position, shown in FIGS. 10 and 11, the grapple arms 12, 13 and 14 extend downward from the grapple body 11 which hangs below the saddle 60. With the grapple body in this grapple position, the grapple and severing head is useful for further processing of already-felled trees, as described below.

When the saddle rotation axis is substantially vertical, the grapple body tilt axis is substantially horizontal, and the grapple arm pivot axes at the pivots 16, 17 can be moved, by tilting the grapple body 11 relative to the saddle 60 about saddle pivot 61, between a substantially vertical orientation, shown in FIGS. 1 to 5, 8, 9, 12 and 13, (useful when gripping upright stems or trunks of trees preparatory to felling) and a substantially horizontal orientation, shown in FIGS. 6, 7, 10 and 11, (useful when grappling felled stems or logs that are lying, or piled, on the ground).

Stationary blades 21 are fitted at opposite ends of the bed plate 15 of the grapple body 11. The blades are preferably provided with a serrated edge for improving the grip of the grapple on a stem, log or tree trunk held between the grapple arms. The serrated blade edges dig into the bark of a gripped stem to help prevent the stem from twisting or sliding in the grapple.

The grappling and severing head described above may be used to process forestry trees, and is particularly useful for tree felling operations, for shovel logging, for putting felled stems though delimbers or debarkers, for cutting logs to length, for repositioning or stacking felled trees and logs, and for loading logs onto transport such a railway cars or truck and trailer combinations. The term 'shovel logging' refers to the repeated repositioning of felled stems, to a position in readiness for removal from the forest, using an excavator-style machine with a boom and grapple head attachment.

Figure 8:
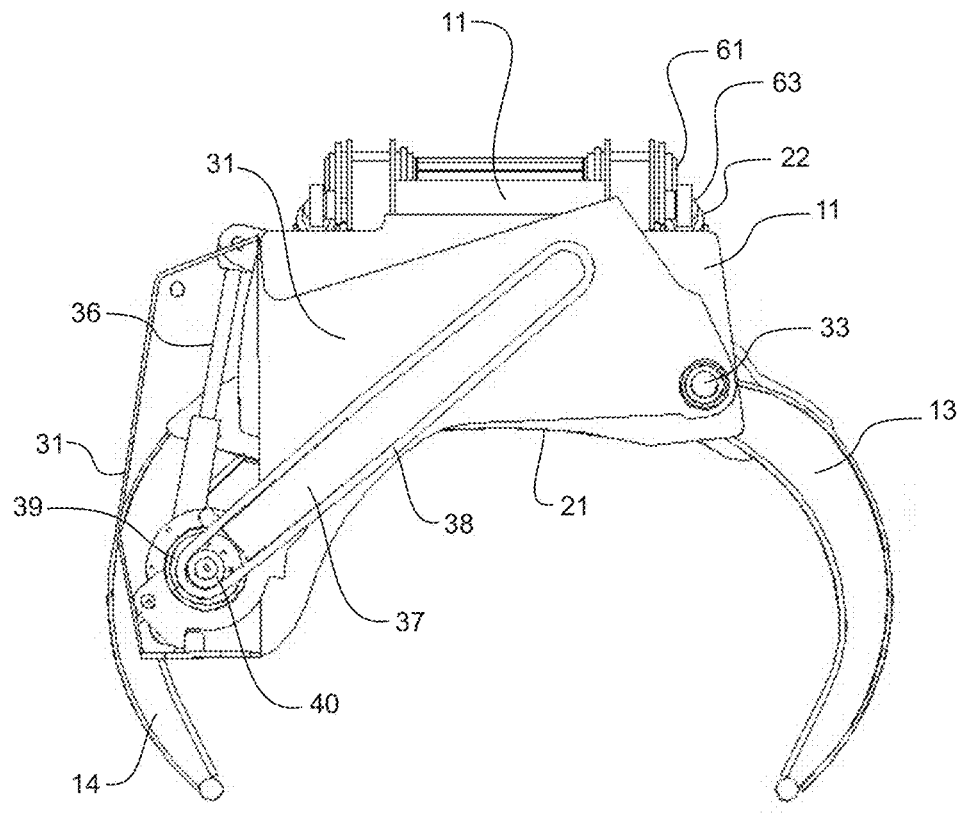
FIG. 8 shows a sectioned bottom view of the grappling and severing head of FIGS. 1 to 7, as seen looking up from below the head and sectioned below the chain saw but above a lower wall of a chain saw housing of the severing assembly body, with the grapple body tilted to the upward position, the grapple arms extended forwardly in the open configuration, the severing assembly body in the extended position, and the chain saw in the stowed position.
Figure 9:
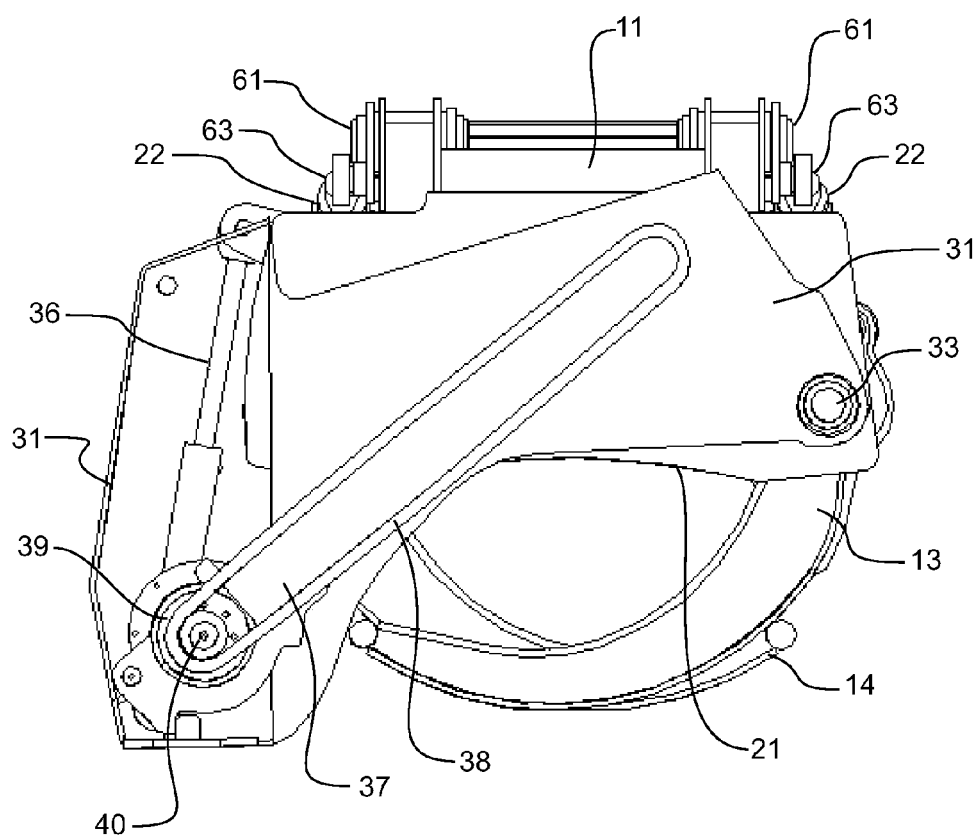
FIG. 9 shows a sectioned bottom view of the grappling and severing head of FIGS. 1 to 8, as seen looking up from below the head and sectioned below the chain saw but above the lower wall of the chain saw housing, with the grapple body tilted to the upward position, the grapple arms extending partially forward in the closed configuration, the severing assembly body in the extended position, and the chain saw in the stowed position.
Figure 10:
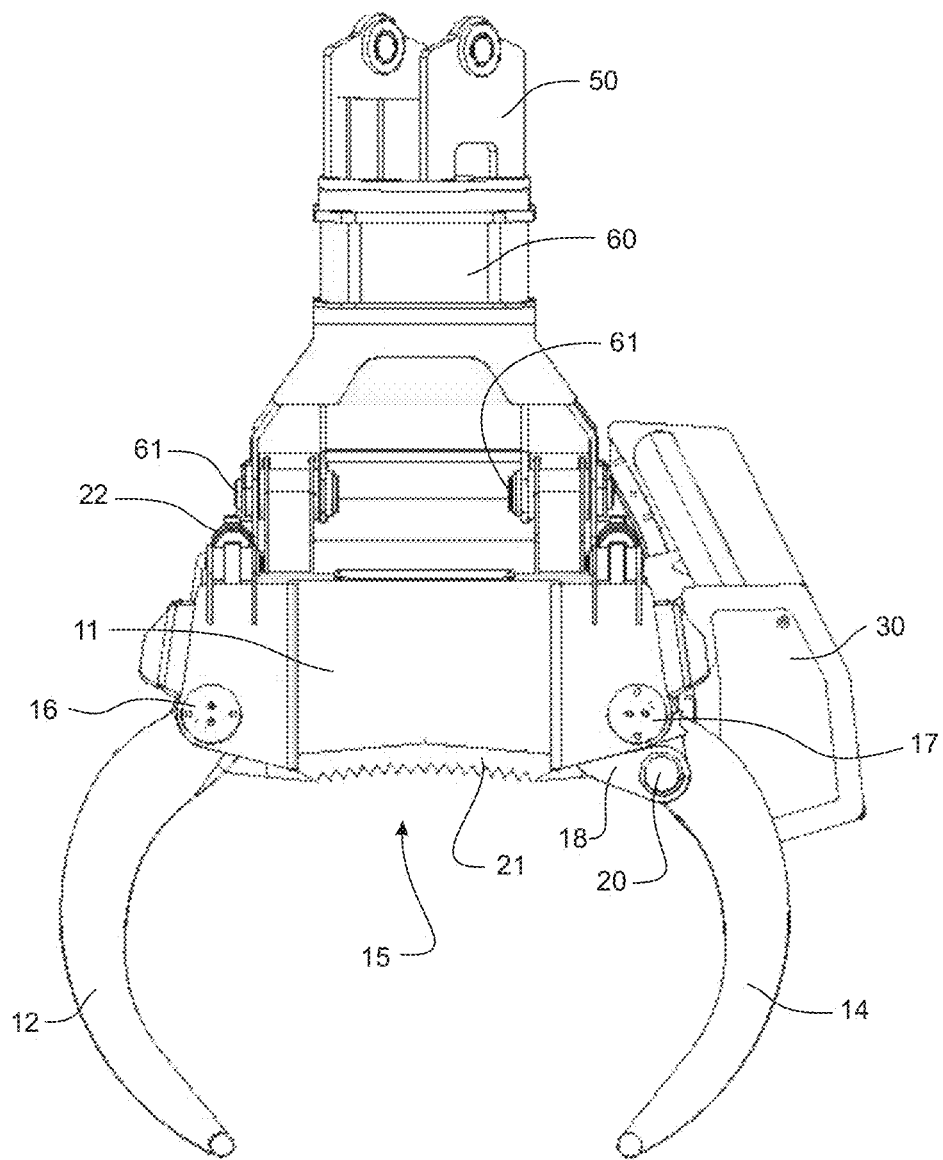
FIG. 10 shows a front view of the grappling and severing head of FIGS. 1 to 9, with the grapple body tilted to the downward position, the grapple arms extended downwardly in the open configuration, the severing assembly body in the retracted position, and the chain saw in the stowed position.
Figure 11:
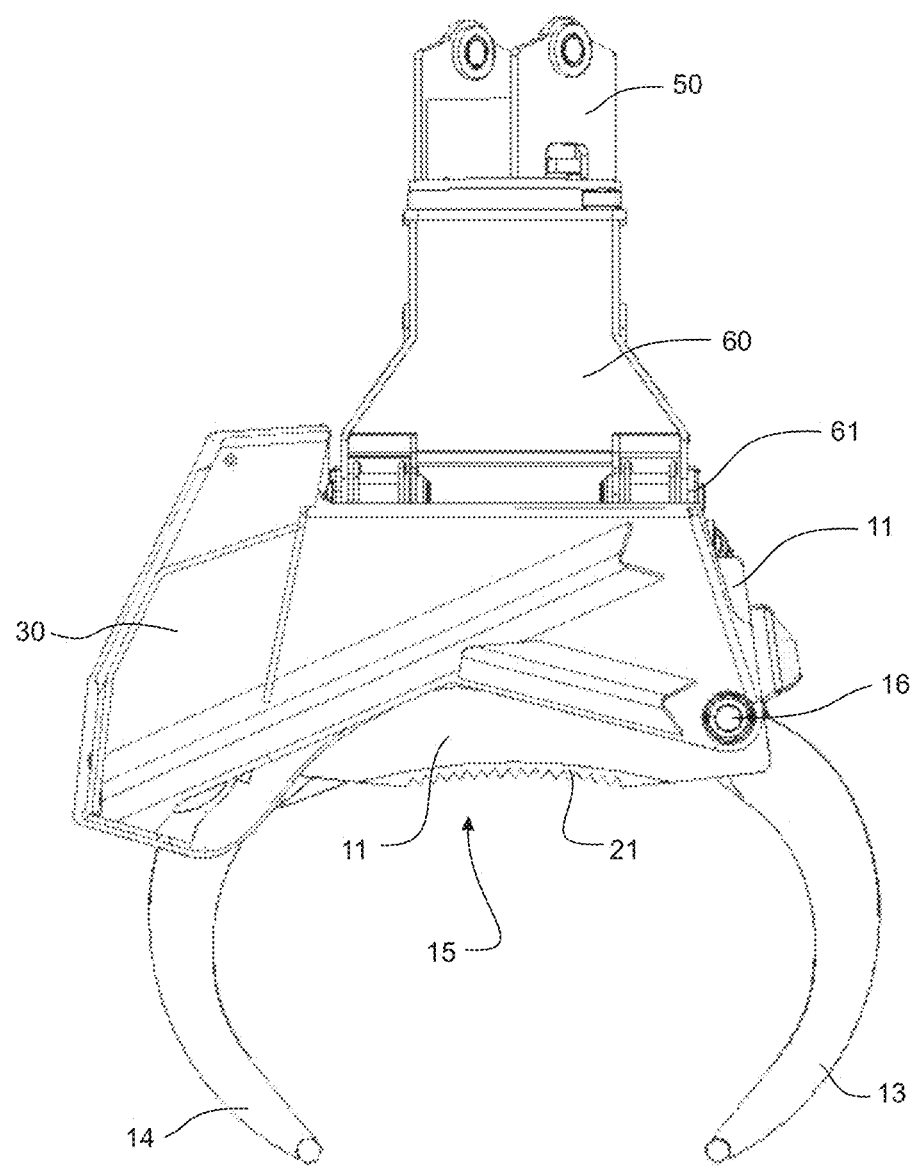
FIG. 11 shows a rear view of the grappling and severing head of FIGS. 1 to 10, with the grapple body tilted to the downward position, the grapple arms extended downwardly in the open configuration, the severing assembly body in the retracted position, and the chain saw in the stowed position.
Figure 12:
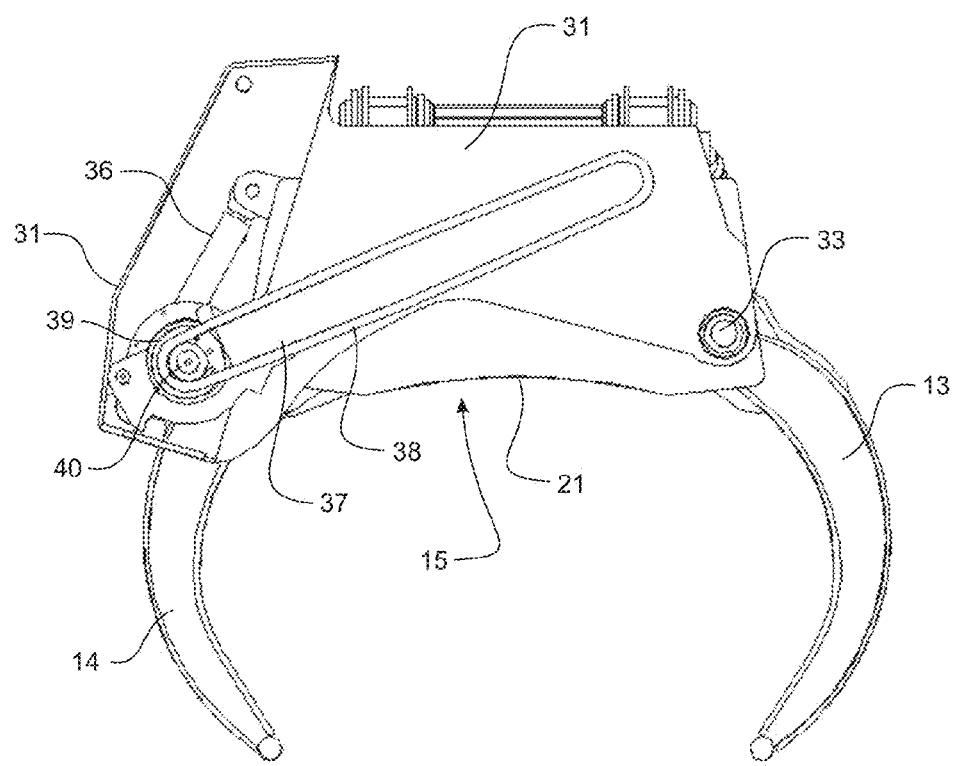
FIG. 12 shows a sectioned bottom view of the grappling and severing head of FIGS. 1 to 11, as seen looking up from below the head and sectioned below the chain saw but above the lower wall of the chain saw housing, with the grapple body tilted to the upward position, the grapple arms extended forwardly in the open configuration, the severing assembly body in the retracted position, and the chain saw in the stowed position.
Figure 13:
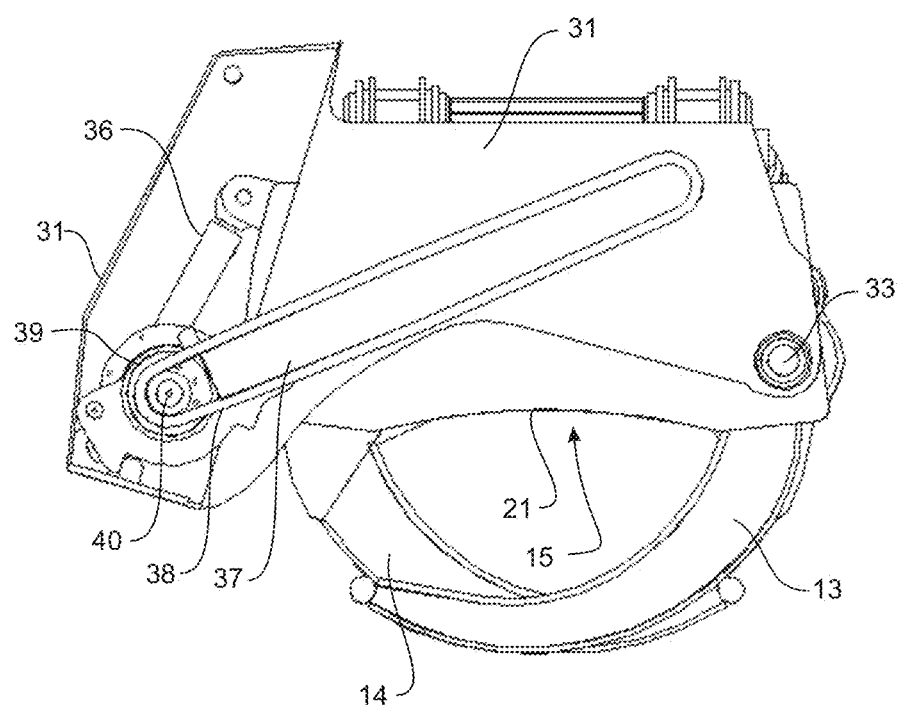
FIG. 13 shows a sectioned bottom view of the grappling and severing head of FIGS. 1 to 12, as seen looking up from below the head and sectioned below the chain saw but above the lower wall of the chain saw housing, with the grapple body tilted to the upward position, the grapple arms extended partially forward in the closed configuration, the severing assembly body in the retracted position, and the chain saw in the stowed position.

In a typical method of using the grappling and severing head described above, the chain saw 32 is retracted to the stowed position in the housing 34 of the severing assembly 30, the severing assembly is extended to the felling position, and the grapple arms 12, 13 and 14 are opened to the open arm configuration, all as shown in the bottom view of FIG. 8. The grapple and severing head is positioned with the open grapple arms around the stem or trunk of a standing tree, and the arms closed, as shown in the bottom view of FIG. 9, to grip the stem or trunk by the grapple.

The chain saw 32 is then progressively extended outward from the housing 34 to pivot through the range of deployed severing positions for cutting through the stem below the gripping grapple arms 12, 13 and 14. With the severing assembly body 31 extended to the felling position, the chain saw 32 can be progressively extended through the range of deployed severing positions to cut through the tree stem. The cut is completed by cutting the last outermost part of the tree stem at the furthermost point from the bed plate 15 of the grapple body. When completing the cut, the pivoting bar of the chain saw is aligned approximately parallel to the bed plate 15 at the front face of the grapple body 11.

When the severing assembly body 31 is in the fully extended position, the pivoting bar of the chain saw 32 can be aligned approximately parallel to the bed plate 15 at the front face of the grapple body 11 when the saw is about to completely sever a larger diameter tree stem. When the cut is about to be completed, it is advantageous for the remaining uncut segment of the tree stem to be furthermost from the bedplate and for the chord of the remaining uncut segment to be at least approximately parallel to the bed plate.

After severing the stem, the grapple may initially maintain the stem upright. The chain saw is retracted to its stowed position in the housing 34 of the severing assembly 30, and the grapple body and grapple arms partially assist the direction of the falling stem. The two hydraulic rams 22 controlling the tilt of the grapple body 11, and the hydraulic motor 51 controlling rotation of the saddle 60, are put in a float mode to allow the weight of the severed stem to tilt and rotate the grapple body as the stem falls to the ground. The operator of the vehicle boom, from which the grapple and severing head is suspended, can also move the boom to help control the falling tree. The hydraulic ram housed in the grapple body 11 is operated to open the grapple arms 12, 13 and 14 and release the grip of the grapple on the stem.

When the severing assembly 30 is retracted to the grappling position, the chain saw pivot at the drive sprocket 40 is substantially in line with the bed plate 15, and the severing assembly is substantially clear of the grapple arms 12, 13 and 14 which are then free to grab one or more felled logs or stems. By stowing the chain saw 32 in the housing 34 and retracting the severing assembly substantially behind the bed plate 15 at the front face of the grapple body, the severing assembly and chain saw are relatively protected from damage and do not intrude substantially into the grappling zone. In this configuration, the grapple and severing head can be used to pick up felled stems, for example when shovel logging, sorting or stacking logs in readiness for loading, or when loading logs onto transport, or when the grapple and severing head is used in conjunction with a static delimber, without substantial interference from the severing assembly.

When the severing assembly is retracted to the grappling position, the chain saw can be progressively extended through the range of severing positions to cut through the log or stem held by the grapple arms, for example for cutting felled logs to pre-determined lengths preparatory to loading onto transport.

It is to be understood that all operations of the grapple and severing head can be performed simultaneously and without regard to the operational position or configuration of any component part of the grapple and severing head. For example, the grapple arms 12, 13 and 14 can be positioned at either the open arm configuration or the closed arm configuration, or anywhere between those two configurations, and the chain saw 32 can be driven and extended and retracted, when the severing assembly 30 is positioned in either the felling or grappling modes or in any intermediate position between those two modes. Furthermore, these operations can be performed for any tilt position of the grapple body 11 relative to the saddle 60, or any rotational position of the saddle 60 relative to the coupling head 50.

In one preferred embodiment of the invention, the maximum stem or log diameter that can be cut is 1 meter in the felling configuration and 0.7 meter in the grapple configuration.

Specific embodiments of the invention have been described above by way of example only, and modifications and improvements as would be obvious to those skilled in the art may be made to the invention without departing from the scope of the invention as defined by the following claims.

In one such modification, the chain saw of the severing device is substituted by a circular saw, disc or guillotine. The use of a circular saw or disc may be useful where typical tree sizes are relatively smaller, for example in the United States of America or Canada, than in New Zealand where chain saw cutting mechanisms are found to be more suitable for the significantly larger tree sizes.

In another modification, the severing assembly body 31 is moved linearly instead of pivoting as described above, to move between a retracted position and an extended position. Similarly, the chain saw 32 or other severing device could be moved linearly, relative to the severing assembly body 31, instead of pivoting.

It is to be understood that although three grapple arms are shown in the embodiment described above, any suitable number of grapple arms may be employed. At least one arm is moveable to open and close the grapple.

It is also to be understood that when the severing assembly body is in the retracted position and the severing device is in the stowed position, the severing assembly body and the severing device lie substantially behind, i.e. further back than, the front face of the grapple body or lie substantially behind the gripping face of at least one of the grapple arms, even when the grapple arms are in an open-arm configuration, so that the severing assembly body and the severing device are clear of the grappling zone, i.e. are clear of a stem or tree or log being grappled by the grappling and severing head. When the severing assembly body is in the retracted position and the severing device is in the stowed position, a portion or all of either one or both of the severing assembly body and the severing device may be positioned to one side of the grapple assembly, i.e. behind the gripping face of one of the grapple arms, and/or a portion or all of either one or both may be positioned behind the front face of the grapple body. In these positions, the severing assembly body and the severing device are relatively protected from inadvertent impacts and do not get in the way of the grapple arms when they are being used in the grappling or shovelling modes.

The invention claimed is:

1. A tree felling and grappling head for gripping and severing a tree stem, the tree felling and grappling head comprising:
   a grapple assembly comprising a grapple body and opposing grapple arms that define a grapple zone, the grapple arms being at respective opposite sides of the grapple zone;
   a coupling head by which the tree felling and grappling head can be suspended from a supporting device;
   a saddle that is rotatably attached to the coupling head for rotation of the saddle, relative to the coupling head, about a saddle rotation axis; and
   a severing assembly comprising a severing assembly body and a severing device;
   wherein:
      the grapple body is tiltable relative to the saddle through at least 90 degrees about a grapple body tilt axis that is substantially perpendicular to the saddle rotation axis, between a tree felling configuration and a grappling configuration;
      the grapple arms are attached to the grapple body and extend forward beyond a front face of the grapple body when the grapple body is in the tree felling configuration;
      each of the grapple arms has a gripping face for contacting an object when gripped by the grapple arms;
      a rear portion of the grapple zone is adjacent the front face of the grapple body and a forward portion of the grapple zone is adjacent free ends of the grapple arms;
      the severing assembly body is pivotally attached to the grapple body at a severing assembly body pivot axis for pivoting relative to the grapple body, between a retracted position and an extended position;
      the severing device is pivotally attached to the severing assembly body for pivoting about a severing device pivot axis, relative to the severing assembly body, between a stowed position and a range of deployed positions;
      the severing assembly body pivot axis and the severing device pivot axis are respectively at the opposite sides of the grapple zone; and
      the severing device pivot axis is substantially parallel to the severing assembly body pivot axis;
   wherein when the severing device is in the stowed position and the severing assembly body is in the retracted position, the severing device and the severing assembly body lie substantially behind the front face of the grapple body, behind the gripping face of at least one of the grapple arms, or both substantially behind the front face of the grapple body and behind the gripping face of at least one of the grapple arms; and
   wherein when the grapple body is in the tree felling configuration and the severing assembly body is in the extended position, the severing device pivot axis is positioned forward of the front face of the grapple body toward the forward portion of the grapple zone so that the severing device can perform a cut in a direction away from the grapple body, with a final portion of the cut positioned at or adjacent the forward portion of the grapple zone.

2. A tree felling and grappling head as claimed in claim 1, wherein:
the grapple arms are pivotally attached to the grapple body at grapple arm pivot axes for pivoting, relative to the grapple body, between an open arm configuration and a closed arm configuration.

3. A tree felling and grappling head as claimed in claim 2, wherein the severing assembly body pivot axis and at least one grapple pivot axis are a common axis.

4. A tree felling and grappling head as claimed in claim 2, wherein the severing assembly body pivot axis is different from any of the grapple arm pivot axes.

5. A tree felling and grappling head as claimed in claim 1, comprising at least two grapple arms on one side of the grapple body and at least one opposed grapple arm on the other side of the grapple body, wherein said at least two grapple arms are pivotally attached to the grapple body for pivotal rotation about a first grapple arm pivot axis and said at least one opposed grapple arms is pivotally attached to the grapple body for pivotal rotation about a second grapple arm pivot axis, for moving the grapple arms between an open arm configuration and a closed arm configuration, and the severing assembly body is pivotally attached to the grapple body for pivotal rotation about the first grapple arm pivot axis.

6. A tree felling and grappling head as claimed in claim 1, wherein the saddle is rotatable, relative to the coupling head, through at least 360 degrees.

7. A tree felling and grappling head as claimed in claim 6, wherein the grapple arms are pivotally attached to the grapple body at grapple arm pivot axes for pivoting, relative to the grapple body, between an open arm configuration and a closed arm configuration; and
wherein the grapple arm pivot axes are substantially coplanar and the grapple body is tiltable, relative to the saddle, through at least 90 degrees for moving the grapple arm pivot axes between a substantially horizontal orientation and a substantially vertical orientation, when the saddle rotation axis is substantially vertical.

8. A tree felling and grappling head as claimed in claim 7, wherein the grapple body is tiltable, relative to the saddle, through at least about 150 degrees.

9. A tree felling and grappling head as claimed in claim 1, wherein the severing assembly body comprises a housing, the stowed position of the severing device is substantially inside the housing, and, when the severing device is in the range of deployed positions, a severing portion of the severing device extends outside the housing.

10. A tree felling and grappling head as claimed in claim 9, wherein the housing houses an actuator for moving the severing device between the stowed position and the range of deployed positions.

11. A tree felling and grappling head as claimed in claim 9, wherein the housing houses an actuator for moving the severing assembly body between the retracted position and the extended position.

12. A tree felling and grappling head as claimed in claim 9, wherein the severing device is a chain saw, and the chain saw comprises a bar which carries a cutting chain and is pivotally attached to the housing for movement of the chain saw between the stowed position and the range of deployed positions.

13. A tree felling and grappling head as claimed in claim 12, wherein in one of the deployed positions of the severing device when the severing assembly body is in the extended position, the bar of the chain saw is approximately parallel to the front face of the grapple body.

* * * * *